(12) United States Patent
Poss et al.

(10) Patent No.: US 10,162,318 B2
(45) Date of Patent: Dec. 25, 2018

(54) SYSTEM AND METHOD FOR CONTROLLING ELECTRICALLY-POWERED TRASH COMPACTORS AND RECEPTACLES

(71) Applicant: BIG BELLY SOLAR, INC., Newton, MA (US)

(72) Inventors: James A. Poss, Brainbridge Island, WA (US); Jeffrey T. Satwicz, Weston, MA (US); Michael E. Feldman, Framingham, MA (US); David J. Skocypec, Medfield, MA (US)

(73) Assignee: BIG BELLY SOLAR, INC., Newton, MA (US)

( * ) Notice: Subject to any disclaimer, the term of this patent is extended or adjusted under 35 U.S.C. 154(b) by 581 days.

(21) Appl. No.: 14/080,166

(22) Filed: Nov. 14, 2013

(65) Prior Publication Data

US 2014/0172174 A1    Jun. 19, 2014

Related U.S. Application Data

(60) Provisional application No. 61/739,442, filed on Dec. 19, 2012.

(51) Int. Cl.
| | |
|---|---|
| *G06F 19/00* | (2018.01) |
| *G05B 15/02* | (2006.01) |
| *B30B 9/30* | (2006.01) |
| *B65F 1/14* | (2006.01) |

(52) U.S. Cl.
CPC ............ *G05B 15/02* (2013.01); *B30B 9/3007* (2013.01); *B65F 1/1426* (2013.01); *B65F 2210/128* (2013.01); *B65F 2210/1443* (2013.01); *B65F 2210/162* (2013.01); *B65F 2210/165* (2013.01);
(Continued)

(58) Field of Classification Search
USPC ........................................................ 100/229
See application file for complete search history.

(56) References Cited

U.S. PATENT DOCUMENTS

| 5,016,197 | A | * | 5/1991 | Neumann | ............. B30B 9/3007 |
| | | | | | 100/229 A |
| 5,204,608 | A | | 4/1993 | Koenck | |
| 5,818,336 | A | | 10/1998 | Varga et al. | |

(Continued)

FOREIGN PATENT DOCUMENTS

| CN | 1629058 A | * | 12/2003 | ................ B65F 9/00 |
| JP | 2002-079220 | | 3/2002 | |

(Continued)

*Primary Examiner* — Kidest Bahta

(57) ABSTRACT

Systems, methods, and computer-readable storage media for controlling electrically-powered trash compactors and receptacles. The system first receives data associated with a storage receptacle configured to communicate with the system via a network, wherein the data is received from a server storing information transmitted by the storage receptacle, the storage receptacle having an energy storage for powering operational functions performed by the storage receptacle. The system then identifies a parameter of the storage receptacle associated with an operational function of the storage receptacle, and transmits a signal to the storage receptacle for modifying the parameter based on the data associated with the storage receptacle to yield a modified operation of the storage receptacle.

20 Claims, 11 Drawing Sheets

(52) U.S. Cl.
CPC ..... *B65F 2210/172* (2013.01); *B65F 2210/20* (2013.01)

(56) References Cited

U.S. PATENT DOCUMENTS

| | | | |
|---|---|---|---|
| 6,081,104 A | 6/2000 | Kern | |
| 6,323,782 B1 | 11/2001 | Stephens et al. | |
| 6,360,186 B1* | 3/2002 | Durbin | B30B 9/3007 100/99 |
| 6,408,261 B1* | 6/2002 | Durbin | B30B 9/3007 100/99 |
| 6,453,270 B1* | 9/2002 | Durbin | B30B 9/3007 340/449 |
| 6,687,656 B2* | 2/2004 | Durbin | B30B 9/3007 340/449 |
| 6,882,269 B2 | 4/2005 | Moreno | |
| 7,040,529 B2 | 5/2006 | Swider et al. | |
| 7,145,450 B2* | 12/2006 | Brown | B30B 9/3007 340/506 |
| 7,481,160 B1* | 1/2009 | Simon | B30B 9/3007 100/229 A |
| 7,926,419 B1 | 4/2011 | Simon et al. | |
| 8,794,135 B1* | 8/2014 | Simon | B30B 9/3007 100/269.01 |
| 2002/0091501 A1* | 7/2002 | Durbin | B30B 9/3007 702/188 |
| 2004/0203377 A1* | 10/2004 | Eaton | H04W 4/02 455/41.2 |
| 2005/0005785 A1* | 1/2005 | Poss | B30B 9/3003 100/240 |
| 2007/0209529 A1 | 9/2007 | Poss et al. | |
| 2007/0268759 A1* | 11/2007 | Sabino | B65F 1/1484 365/192 |
| 2008/0067227 A1* | 3/2008 | Poss | A47G 29/22 232/17 |
| 2009/0272677 A1* | 11/2009 | Mallett | B07C 7/005 209/583 |
| 2010/0071572 A1* | 3/2010 | Carroll | B30B 9/3042 100/229 A |
| 2010/0071575 A1* | 3/2010 | Stadlmair | B41F 7/26 101/483 |
| 2010/0116881 A1* | 5/2010 | Flood | B65F 1/1484 235/380 |
| 2011/0130906 A1* | 6/2011 | Mayer | G07C 5/008 701/22 |
| 2011/0174170 A1* | 7/2011 | Fritz | B30B 9/3007 100/35 |
| 2012/0312049 A1* | 12/2012 | Downs, III | A23G 9/20 62/340 |

FOREIGN PATENT DOCUMENTS

| | | |
|---|---|---|
| JP | 2002-142271 | 5/2002 |
| JP | 2003-341802 | 12/2003 |
| WO | WO 2012/015664 | 2/2012 |

* cited by examiner

FIG. 9

| 902A | 902B | 902C | 902D | 902E | 902F |

| OVERVIEW | STATUS | REPORTS ▽ | ALERTS | INVENTORY | ADMINISTRATION ▽ |

FULLNESS SUMMARY — 904

| 906 WASTE STREAM | FULLNESS LEVEL | | | TOTAL VOLUME (LAST 6 MONTHS) | |
| --- | --- | --- | --- | --- | --- |
| | GREEN | YELLOW | RED | GALLONS | % |
| CLASSIC RECYCLER | 0 | 0 | 0 | 0 | 0 |
| SINGLE STREAM | 0 | 0 | 0 | 0 | 0.00 |
| TRASH | 213 | 18 | 7 | 262.500 | 100.00 |
| ALL WASTE STREAM | 213 | 18 | 7 | 262.500 | 100 |

908 · 910 · 900

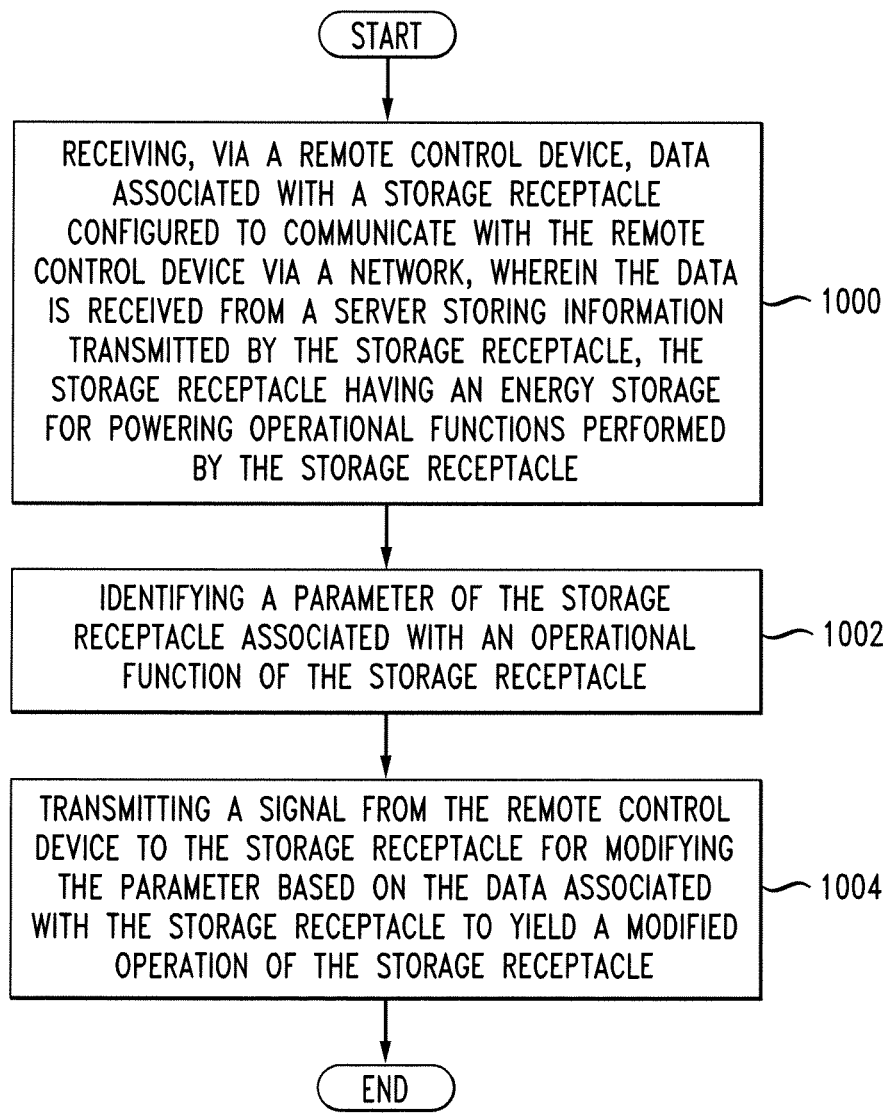

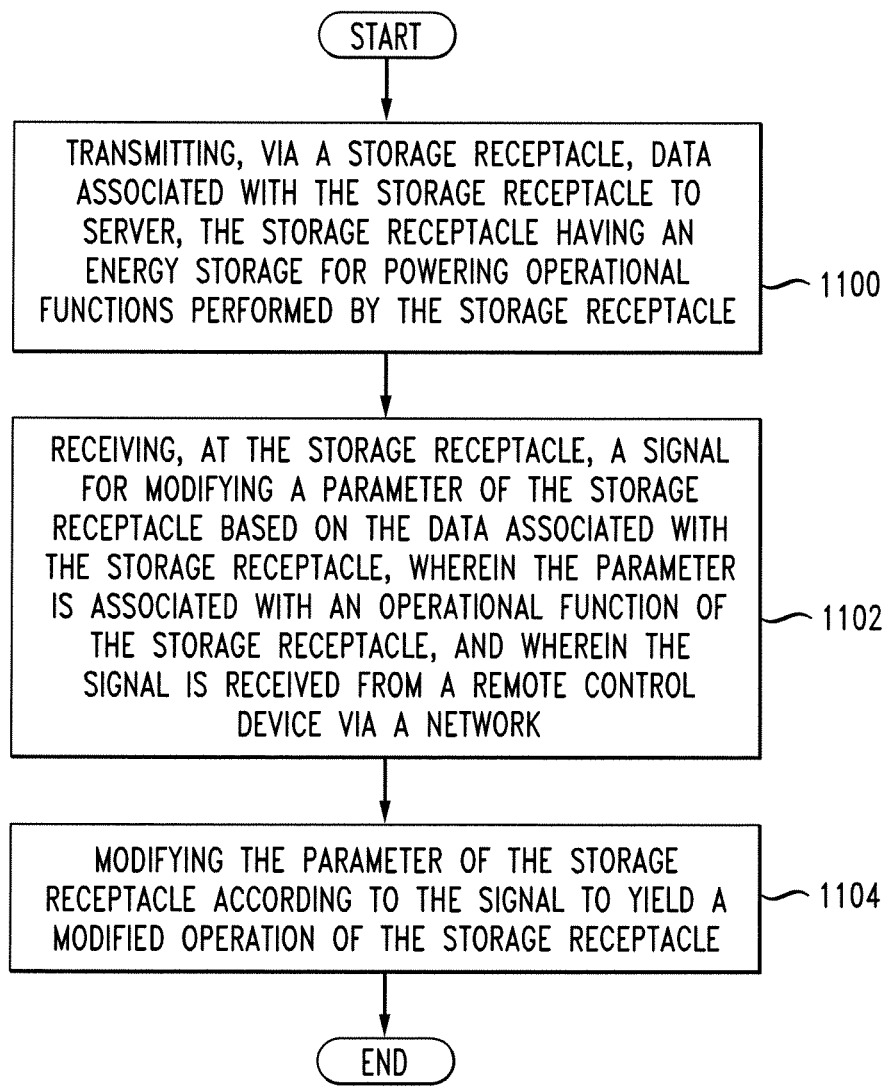

SYSTEM AND METHOD FOR CONTROLLING ELECTRICALLY-POWERED TRASH COMPACTORS AND RECEPTACLES

PRIORITY INFORMATION

The present application claims priority to U.S. Provisional Application No. 61/739,442, filed Dec. 19, 2012, the content of which is incorporated herein by reference in its entirety.

BACKGROUND

1. Technical Field

The present disclosure relates to trash receptacles and more specifically to controlling electrically-powered trash compactors and receptacles for collecting solid waste.

2. Introduction

Collection of solid waste is an expensive and polluting procedure. Every day, heavy trucks are deployed to collect trash and recyclable materials. However, there is significant waste in the current collection operations. For example, collections are often made to receptacles which are not full and, in fact, are capable of holding additional waste. Many times, collections are made to receptacles that are incorrectly sized for a given route, resulting in a significant waste of time. Moreover, numerous trips are typically made by trucks to collect materials that can be greatly compacted to reduce the number of necessary trips and, consequently, the cost of the collection process.

Furthermore, the receptacles and compactors for waste and recyclables used by the current collection solutions are prone to poor utilization. As a result, high implementation, operational and service costs are incurred by the current collection solutions. For example, costly components, such as motors, batteries and various sensors and electronics, are typically used to power a compactor or a communicating device. Here, such components are not prudently applied or efficiently driven. Also, communications costs are typically high, as communications components are often not used efficiently. In some cases, costly networks are used even when free networks are otherwise available.

This problem is exacerbated by the static design and operational parameters of the current receptacles and compactors, which often prove to be inadaptable to the environment or evolving standards and practices. For example, standard receptacles and compactors are generally limited in their applicability to various types of locations and operations. As a result, current solutions are not robust, and provide limited flexibility and adaptability.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to manage and control electrically-powered trash compactors and receptacles for collecting solid waste. Users can remotely capture critical information from trash compactors and receptacles, and transmit additional information to the trash compactors and receptacles. The information from trash compactors and receptacles, as well as additional information from other sources, can be used to manage, control, and monitor the trash compactors and receptacles, and implement customized solid waste collection procedures. The added control and flexibility of the trash compactors and receptacles can provide improvements in energy use and generation. The users can greatly benefit from the improved efficiency, cost effectiveness and ease of operating such trash compactors and receptacles, and aggregating such devices in a solid waste collection procedure. Moreover, these approaches can significantly reduce the cost of designing, implementing, and operating networked trash compactors and receptacles.

Disclosed are systems, methods, and non-transitory computer-readable storage media for controlling electrically-powered trash compactors and receptacles. The system can receive data associated with a storage receptacle configured to communicate with the system via a network, wherein the data is received from a server storing information transmitted by the storage receptacle, the storage receptacle having an energy storage for powering operational functions performed by the storage receptacle. The storage receptacle can be a solar and/or battery powered compactor, for example. The system can then identify a parameter of the storage receptacle associated with an operational function of the storage receptacle, and transmit a signal to the storage receptacle for modifying the parameter based on the data associated with the storage receptacle to yield a modified operation of the storage receptacle. In some embodiments, the system can also transmit the data to a device associated with a user for presentation to the user. The system can then receive an instruction from the device associated with the user to modify the parameter of the storage receptacle. The system can also receive additional data from the device, a request from the user, an input from the user, a command from the device, a notification from the device, a parameter, an update, a configuration setting, a file, etc.

The operational function can include, for example, compacting contents, sensing contents volume inside the storage receptacle, powering a status lamp, communicating with the remote control device, communicating with the server, powering the storage receptacle, gathering weather data, gathering temperature information, running a sensor, measuring a current, detecting a movement of an item in the storage receptacle, testing a battery, powering an advertisement display, etc. Moreover, the parameter can include a compaction timing, an energy usage, a timing of a sensor actuation, a desired capacity, a fullness threshold, a power mode, a fullness state, a command, a status update, an energy setting, an operating setting, a collection timing, a communication interval, a test setting, an operating current, a compaction trigger, etc. Further, the modified operation can include a modified compaction schedule, a modified compaction threshold, a modified power mode, a modified capacity, a modified sensing timing, a modified communication schedule, a modified operation of the motor, an actuation of an operation, a termination of an operation, etc.

The parameter can be modified based on the data, a user input, weather conditions, a collection schedule, data about a collection route, traffic conditions, a proximity of a collection vehicle, a time, a date, a location, a capacity, a fullness state, lapsed time between collections, lapsed time between compactions, usage conditions, energy usage, battery conditions, statistics, a detected movement of an object, industry benchmarks, historical data, forecasted data, collection trends, industry standards, real-time information, user preferences, etc. The data can include sensed data, statistics, operating conditions, device characteristics, fullness state, a device status, data about an event, a measurement, data about an operation, a log, an alert, a value, real-time information, a diagnosis, a user input, etc.

BRIEF DESCRIPTION OF THE DRAWINGS

FIG. 9 illustrates an example of a presentation of collection statistics;
FIG. 10 illustrates a first method embodiment;
and
FIG. 11 illustrates a second method embodiment.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure provides a way to control and manage electrically-powered trash compactors and receptacles. Moreover, the present disclosure provides a way for a using a remote controlling device and associated architecture for a network of electrically-powered compactors and receptacles. This architecture can increase energy efficiency and provide communication and control aspects to optimize collection operations for the network of compactors and receptacles. By adapting to changing needs, trends, and best practices, the architecture can improve collection vehicle utilization, and reduce implementation costs in a network. Moreover, these approaches can be implemented with a network of solar and battery powered compactors and waste and recycling receptacles. Further, these approaches can improve recycling contamination rates and total recycling yields. In addition, solar, battery powered, and/or AC connected compactors and receptacles can be made significantly cheaper and more effective when controlled and networked according to the approaches set forth herein.

A system, method and computer-readable media are disclosed which control electrically-powered trash compactors and receptacles. A brief introductory description of a basic general purpose system or computing device in FIG. 1, which can be employed to practice the concepts, is disclosed herein. A more detailed description and variations of electrically-powered receptacles and remote control devices for controlling electrically-powered receptacles will then follow. These variations shall be described herein as the various embodiments are set forth. The disclosure now turns to FIG. 1.

Figure 1:
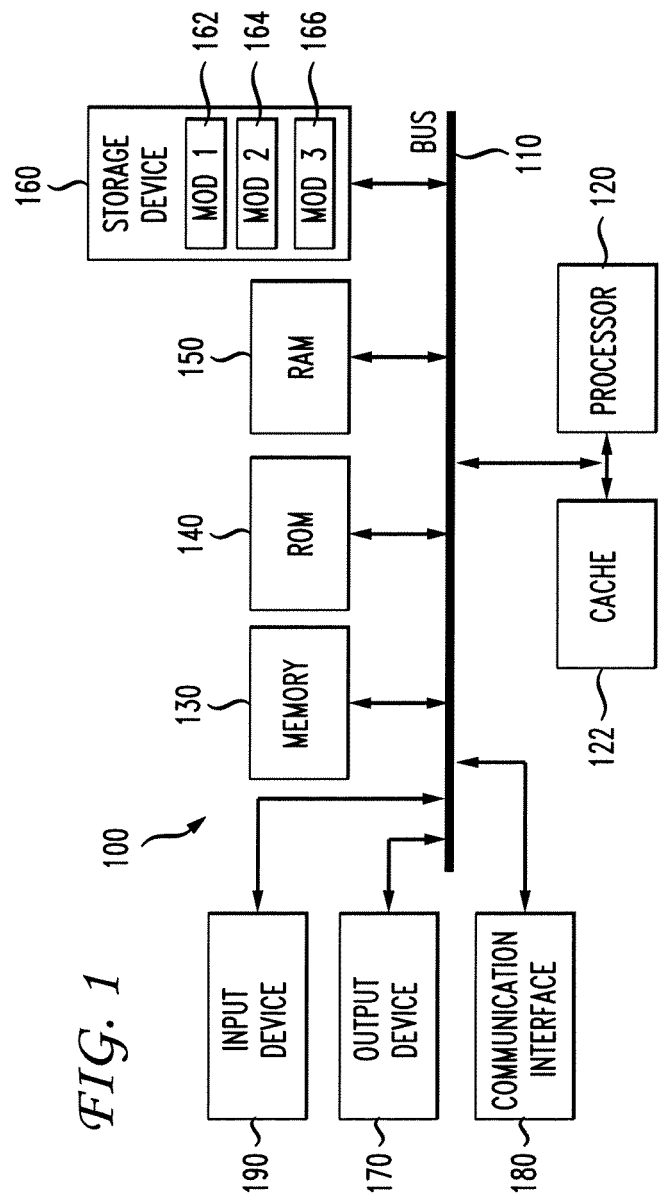
FIG. 1 illustrates an example system embodiment.

With reference to FIG. 1, an example system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the example embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the example operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
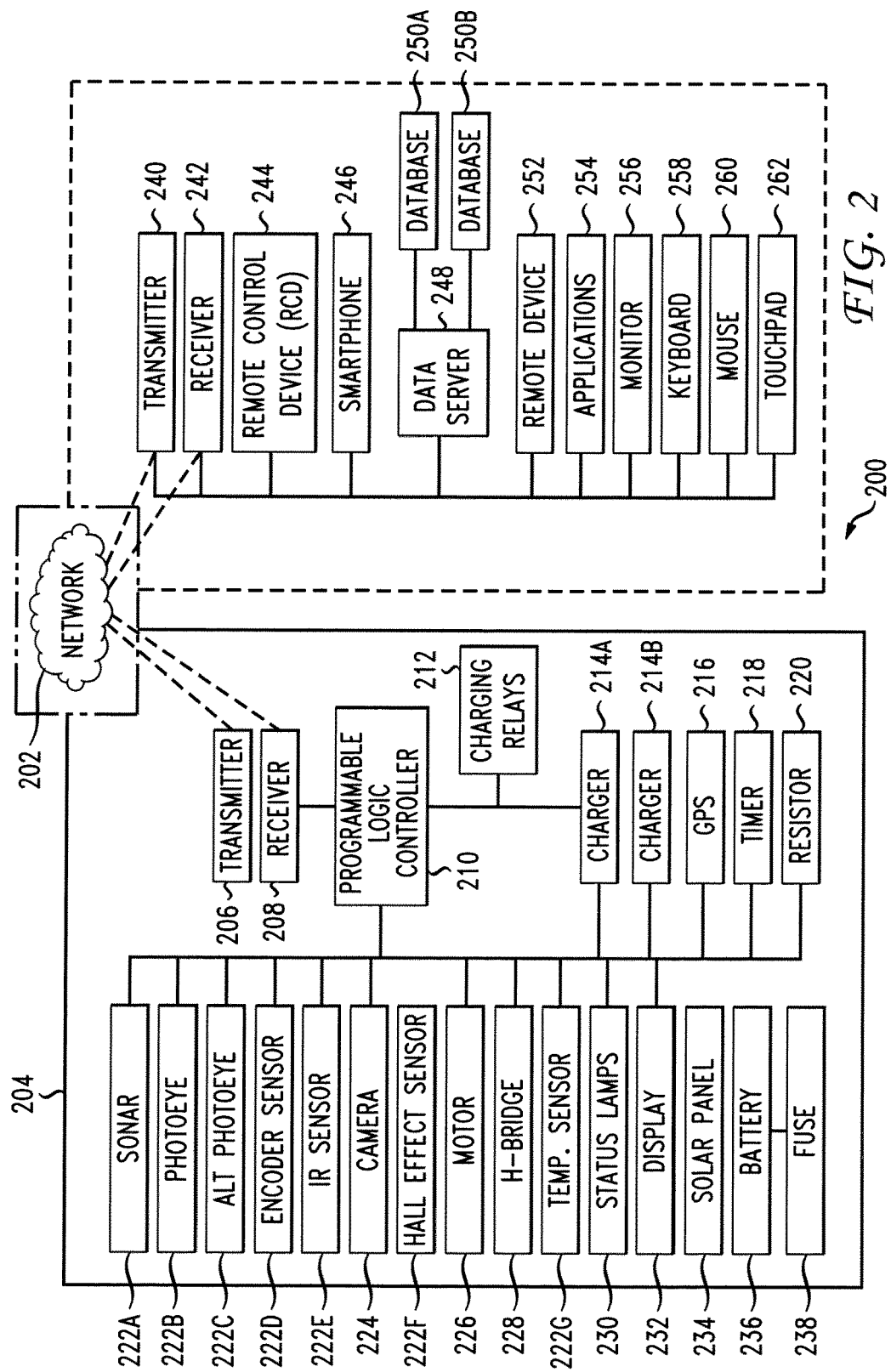
FIG. 2 illustrates an example architecture for remotely controlling electrically-powered compactors.

Having disclosed some components of a computing system, the disclosure now turns to FIG. 2, which illustrates an example architecture for remotely controlling electrically-powered compactors. Receptacle 204 can be an electrically-powered receptacle for collecting waste, such as trash and recyclables, for example. Receptacle 204 can be, for example, a solar or battery-powered receptacle and/or compactor. Moreover, receptacle 204 can include a motor 226 for performing various operations, such as compaction operations. Further, receptacle 204 can be remotely controlled via remote control device (RCD) 244. To this end, receptacle 204 can include transmitter 206 and receiver 208 for communicating with RCD 244. In particular, transmitter 206 and receiver 208 can communicate with transmitter 240 and receiver 242 on RCD 244, and vice versa. Here, transmitters 206 and 240 can transmit information, and receivers 208 and 242 can receive information. This way, receptacle 204 and RCD 244 can be connected to transmit and receive information, such as instructions, commands, statistics, alerts, notifications, files, software, data, and so forth. Receptacle 204 can also communicate with other devices, such as a server and/or a collection vehicle, via transmitter 206 and receiver 208. Similarly, RCD 244 can communicate with other devices, such as a server and/or a user device 246, 252, via transmitter 240 and receiver 242.

Moreover, receptacle 204 and RCD 244 can communicate with each other and/or other devices via network 202. The network 202 can include a public network, such as the Internet, but can also include a private or quasi-private network, such as an intranet, a home network, a virtual private network (VPN), a shared collaboration network between separate entities, etc. Indeed, the network 202 can include many types of networks, such as local area networks (LANs), virtual LANs (VLANs), corporate networks, wide area networks, a cell phone transmitter and receiver, a WiFi network, a Bluetooth network, and virtually any other form of network.

Transmitter 206 and receiver 208 can be connected to printed circuit board (PCB) 210, which controls various functions on receptacle 204. In some embodiments, the RCD 244 can be incorporated within the PCB 210. In FIG. 2, the RCD 244 is electrically connected to the PCB 210 via transmitters 206, 240 and receivers 208, 242. The RCD 244 can be connected to transmitter 240 and receiver 242 via a two-way communication port, which includes transmitter 240 and receiver 242. The PCB 210 can control electrical functions performed by the receptacle 204. Electrical functions can include, for example, running compactions by actuating a motor 226; sensing waste or recyclables volume inside the receptacle 204 using a sensor at regular or programmable intervals, such as a sonar-based sensor 222A, a proximity sensor, and/or photoeye sensors 222B-C; changing status lamps 230 at regular and/or programmable thresholds to/from a color indicating that the receptacle 204 is not full (e.g., green), to/from a color indicating that the receptacle 204 is almost full (e.g., yellow), to/from a color indicating that the receptacle 204 is full (e.g., red); etc.

The RCD 244 can enable remote control and/or alteration of the functions performed or operated by the PCB 210. The RCD 244 can also provide access to, and control over, the various components 206, 208, 210, 212, 214A-B, 216, 218, 220, 222A-G, 224, 226, 228, 230, 232, 234, 236, 238 of the receptacle 204. Users can use a networked device, such as smartphone 246 and/or remote device 252, to communicate with the RCD 244 in order to manage and/or control the receptacle 204. For example, a user can communicate with the RCD 244 via the remote device 252 to change a threshold value on the PCB 210, which can control, for example, a collection timing; the compaction motor 226; the use of energy on a lighted advertising display, such as display 232; the status lamps 230; the sensors 222A-G; the camera 224; etc. The remote device 252 can include virtually any device with networking capabilities, such as a laptop, a portable media player, a tablet computer, a gaming system, a smartphone, a global positioning system (GPS), a smart television, a desktop, etc. In some embodiments, the remote device 252 can also be in other forms, such as a watch, imaging eyeglasses, an earpiece, etc.

The remote device 252 and RCD 204 can be configured to automatically modify the PCB's 210 operating parameters. However, users can also manually modify the PCB's 210 operating parameters via the remote device 252 and RCD 204. The operating parameters can be modified in response to, for example, evolving industry benchmarks; user inputs; historical data, such as the data gathered from a separate database 250A-B; forecasted data, such as upcoming weather characteristics; traffic conditions; a collection schedule; a collection route; a proximity of a collection vehicle; a time and/or date; a location; a capacity, such as a capacity of the receptacle 204 and/or a capacity of a collection vehicle; a fullness state of the receptacle 204; lapsed time between collections; lapsed time between compactions; usage conditions of the receptacle 204; energy usage; battery conditions; statistics; a policy; regulations; a detected movement of an object, such as an object inside or outside of the receptacle 204; collection trends; industry and/or geographical standards; zoning policies and characteristics; real-time information; user preferences; and other data. The data from the remote device 252 can be relayed to the RCD 244, and the data from the RCD 244 can be relayed, via the network 202, to the receptacle 204 and/or the remote device 252 for presentation to the user.

The user can control the RCD 244 and/or access and modify information on the RCD 244 via a user interface, such as a web page, an application 254, a monitor 256, and/or via voice messages and commands, text messages, etc. The remote device 252 can include a user interface, which can display, for example, graphs of collection statistics and trends (e.g., collection frequency, usage, temperature, etc.), collection reports, device settings, collection schedules, collection configurations, historical data, status information, collection policies, configuration options, device information, collection routes and information, alerts, etc. This way, users can access information to make educated decisions about how to set and/or reset operating parameters on the PCB 210; to control, for example, which sensors are used to gather data, which thresholds to set; to control outputs from the status lamps 230 and other components; etc. User can change settings on the receptacle 204, such as optimal collection timing, timing of sensor actuation; and/or modify parameters, such as desired capacity and fullness thresholds; using a scroll down menu, as shown in FIGS. 6-9 below, click-and-slide tools, interactive maps displayed on the remote device 252, touch screens, forms, icons, text entries, audio inputs, text inputs, etc. In response, the RCD 244 can automatically reconfigure the PCB 210 settings, recalibrate sensors and displays, change operating parameters, etc.

The RCD 244 can include a two-way communication port that includes transmitter 240 and receiver 242, which can wirelessly communicate with the PCB 210 of the receptacle 204, via the transmitter 206 and receiver 208 on the receptacle 204, which are connected electrically to the PCB 210. On scheduled and/or programmable intervals, the PCB's 210 transmitter 206 can send data to a central server, such as data server 248, via the network 202. Moreover, the RCD's 244 receiver 242 can be configured to query the data server 248, which can also be connected to the remote device 252, for incoming data. The data server 248 can communicate data from databases 250A-B. If there is no data to be received by the receiver 208, the PCB 210 can be configured to promptly return to a low-power mode, where the transmitter 206 and receiver 208 circuits are turned off, until another scheduled, received, initiated, and/or programmed communication event. If there is data to be received by the receiver 208, such as a command to turn the receptacle 204 off and then back on, a command to change the thresholds upon which compactions are operated, a command to change the thresholds for providing status updates and/or determining fullness states, etc., then the RCD receiver 242 can download the new data from the data server 248, via the RCD 244, to the PCB 210, altering its operating configuration. The RCD receiver 242 can also be configured to send data to the data server 248 to acknowledge the receipt of data from the PCB 210, and to send selected data to the remote device 252, the smartphone 246, and/or any other device, for presentation to a user.

The data server 248 can also display the data to a user on remote device 252, smartphone 246, or any other device. The data can be a password-protected web page, a display on the smartphone 246, a display on the monitor 256, etc. Remote control using the RCD 244 to reconfigure operating thresholds, sensor use, sensor hierarchy, energy usage, etc., can enable the receptacle 204 to alter characteristics that control its energy generation, energy consumption, and/or the collection and management logistics, further enabling sound operation of the receptacle 204.

The RCD 244 can be configured to communicate over a wireless network with the PCB 210, and transmit data to the data server 248, so the data can be stored for viewing and manipulation by a user via any web-connected computer, phone, or device. The RCD 244 can also be configured to receive data from the data server 248, and transmit the data back to the PCB 210. The PCB 210 can be electrically connected to a variety of sensors, such as sensors 222A-G, within the receptacle 204. Through the RCD 244, the PCB 210 can also be wirelessly connected to the databases 250A-B, and/or other external databases, such as a weather database, which may, for example, reside on a National Oceanographic and Atmospheric (NOAA) server, a database of trucks and locations and schedules, which may reside on a waste hauler's server, a database of traffic conditions, etc. A user can also change which of the sensors 222A-G are used in setting thresholds, among other things, in response to, for example, user commands and/or changes in outside data, such as weather data or truck location data.

The PCB 210 can also communicate with a temperature sensor 222G to gather temperature information, which can be transmitted to the RCD 244 via the PCB transmitter 206. The temperature information can be used, among other things, to fine tune operational functions and energy consumption of the receptacle 204. For example, the PCB 210 can be reconfigured to run less compaction per day, such as four to eight compactions, in cold weather, since batteries are less powerful in cold weather. Coinciding with cold weather, the winter days are shorter, thus solar energy and battery power is limited. In order to conserve power on low-sunlight days, the RCD 244 can adjust the PCB's 210 normal fullness sensitivity levels, so that collections are prompted to be made earlier. For example, if the PCB 210 typically runs 20 compactions before changing status lamps from green to yellow, a signal that suggests optimal collection time, the RCD 244 can adjust the thresholds of the PCB 210 to run 10 compactions before changing from a green state to a yellow state, thus changing the total energy consumption of the compactor between collections. In a busy location, the PCB 210 can be configured to sense receptacle fullness every minute, whereas in a less busy location, the PCB 210 can be configured to sense fullness once a day.

In some embodiments, the RCD 244 can also alter the timing of events using algorithms based on the results of historical events. For example, the RCD 244 can be initially configured to sense fullness once per minute, but based on resulting readings, it can then alter the timing of future readings. Thus, if three consecutive readings taken at one-minute intervals yield a result of no trash accumulation, the RCD 244 can increase the timing between readings to two minutes, then three minutes, etc., based on the various readings. The RCD 244 can also be configured to adjust sensing intervals based on the level of fullness of the receptacle 204, so it would sense more frequently as the receptacle 204 fills, in order to reduce the margin of error at a critical time, before the receptacle 204 overflows. This "learning feature" can save energy by ultimately synchronizing the sensor readings with actual need to sense. The RCD 244 can also alter thresholds of status lamps 230 based on collection history, the need for capacity as determined by the frequency of red or yellow lights on the receptacle 204, temperatures, expected weather and light conditions, expected usage conditions, etc. The status lamps 230 can be LED lights, for example.

In FIG. 2, the RCD 244 can be enabled, via the PCB 210, to read, for example, a temperature sensor 222G; an encoder sensor 222D, which can measure movement of a compaction ram by utilizing an "encoder wheel" which is mounted on a motor shaft; one or more photoeye sensors 222B-C; door sensors; a sensor which measures current from the solar panel and a sensor which can measure current from the battery 236 to the motor 226; a hall effect sensor 222F, which can detect movement of, for example, a door; an infrared (IR) sensor 222E, a camera 224, etc. In addition, the thresholds set by the RCD 244 can be based on historical and real-time information, user preferences, industry norms, weather patterns and forecasts, and other information. The RCD 244 can reset the PCB's 210 normal thresholds hourly, daily, weekly, monthly, yearly, or at adjustable intervals, based on a variety of information and user decisions.

The RCD 244 can also alter the PCB's 210 normal hierarchy of sensor usage. For example, if the PCB 210 is configured to run a compaction cycle when one or more of the photoeyes 222B-C located inside the receptacle 204 are blocked, the RCD 244 can reconfigure the sensor hierarchy by reconfiguring the PCB 210 to run compaction cycles after a certain amount of time has passed, by reading the position of the encoder sensor 222D at the end of a cycle, by reading one or more photoeye sensors 222B-C, by calculating a sensor hierarchy based on historical filling rates, by a change in user preferences, etc. Using an aggregate of data from other receptacles located worldwide in a variety of settings, the RCD's 244 configurations can depend on constantly evolving parameters for optimizing energy utilization, capacity optimization, and operational behavior, among other things. The RCD 244 innovation and growing database of benchmarks, best practices and solutions to inefficiency, enables the receptacle 204 to adapt and evolve.

Based on the data from the PCB 210, the sensors, inputs by the users (e.g., the customer or the manufacturer) via the RCD 244, and/or based on other data, such as historical or weather data, the RCD 244 can change the PCB 210 thresholds, operational parameters, and/or configuration, to improve the performance of the receptacle 204 in different geographies or seasons, or based on different user characteristics or changing parameters. Thus, the system and architecture can be self-healing.

The RCD 244 can also be configured to change the PCB's 210 normal operating parameters. For example, the RCD 244 can be configured to cause the PCB 210 to run multiple compaction cycles in a row, to run energy through a resistor 220 to apply a strong load upon the battery 236, which can supply the energy. The RCD 244 can measure battery voltage at predetermined or programmable intervals, to measure the "rebound" of the battery 236. A strong battery will gain voltage quickly (e.g., the battery will almost fully recover within 15 minutes or so). A weak battery will drop significantly in voltage (e.g., 3-5 volts), will recover slowly, or will not recover to a substantial portion of its original voltage. By changing the normal parameters of the PCB 210, the battery 236 can be subjected to a heavy load during a test period, which will determine the battery's strength without jeopardizing operations. The RCD 244 can then be configured to relay a message to the user that a battery is needed, or to use the battery differently, for example, by spacing out compactions in time, reducing the degree of voltage decline within a certain time period, etc. The RCD 244 can also alter the PCB 210 to do more compactions or other energy-using functions (like downloading software) during the daytime, when solar energy is available to replenish the battery 236 as it uses energy. Moreover, the user can then order a new battery by simply clicking on a button on a web page, for example.

Since the RCD 244 can be connected to databases, and can be informed by the PCB 210 on each receptacle, the RCD 244 can also be used to relay data for other types of servicing events. For example, the RCD 244 can be configured to relay a message to a waste hauler to collect the receptacle 204 if two or more parameters are met simultaneously. To illustrate, the RCD 244 can relay a message to a waste hauler to collect the receptacle 204 if the receptacle 204 is over 70% full and a collection truck is within 1 mile of the receptacle 204. The RCD 244 can then send a message to the remote device 252 to alert a user that a collection had been made, and the cost of the collection will be billed to the user's account.

In addition, the RCD 244 can change the circuitry between the solar panel 234 and the battery 236, so that solar strength can be measured and an optimal charging configuration can be selected. The charging circuitry 214A-B is illustrated as two circuitries; however, one of ordinary skill in the art will readily recognize that some embodiments can include more or less circuitries. Charging circuits 214A-B can be designed to be optimized for low light or bright light, and can be switched by the RCD 244 based on programmable or pre-determined thresholds. Also, while solar information can be readily available (e.g., Farmers' Almanac), solar energy at a particular location can vary widely based on the characteristics of the site. For example, light will be weaker if reflected off a black building, and if the building is tall, blocking refracted light. For this reason, it can be useful to measure solar energy on site, as it can be an accurate determinant of actual energy availability at a particular location. To do this, the battery 236 and solar panel 234 can be decoupled using one or more charging relays 212. In other aspects, a very high load can be placed on the battery 236 to diminish its voltage, so that all available current from the solar panel 234 flows through a measureable point. This can be done, for example, by causing the receptacle 204 to run compaction cycles, or by routing electricity through a resistor, or both.

There are a variety of other methods which can be used to create a load. However, putting a load on the battery 236 can cause permanent damage. Thus, the RCD 244 can also be configured to disconnect the battery 236 from the solar panel 234, instead routing electricity through a resistor 220. This can allow for an accurate measurement of solar intensity at a particular location, without depleting the battery 236, which can help assess the potential for running compactions, communicating, powering illuminated advertisements, and powering other operations. In some embodiments, the PCB 210 can be reconfigured by the RCD 244 to run continuous compaction cycles for a period of time, measure solar panel charging current, relay the data, and then resume normal operations. Different configurations or combinations of circuits can be used to test solar intensity, battery state or lifecycle, and/or predict solar or battery conditions in the future.

The RCD 244 can also track voltage or light conditions for a period of days, and alter the state of load and charging based on constantly changing input data. For example, the RCD 244 can configure the timer 218 of the PCB 210 to turn on the display 232 for advertising for a number of days in a row, starting at a specific time and ending at another specific time. However, if the battery voltage declines over this period of time, the RCD 244 can then reduce the time of the load (the display 232) to every other day, and/or may shorten the time period of the load each day. Further, the RCD 244 can collect information on usage and weather patterns and reconfigure the PCB's 210 normal operating regimen to increase or reduce the load (for example, the advertisement on the display 232) placed on the battery 236, based on the information collected. For example, if it is a Saturday, and expected to be a busy shopping day, the RCD 244 can allow a declining state of the battery 236, and can schedule a period on the near future where a smaller load will be placed on the battery 236, by, for example, not running the advertising on the coming Monday. In doing so, the RCD 244 can optimize the advertising value and energy availability to use energy when it is most valuable, and recharge (use less energy) when it is less valuable. In order to maximize solar energy gained from a variety of locations, the RCD 244 can cause the PCB 210 to select between one of several charging circuits. For example, if it is anticipated that cloudy conditions are imminent, the RCD 244 can change the circuit that is used for battery charging, in order to make the charger more sensitive to lower light conditions. In a sunny environment, the charger circuit used can be one with poor low-light sensitivity, which would yield more wattage in direct sunlight.

The architecture 200 can also be used for monitoring functions, which can enable users to access information about the receptacle 204 and collection process. With this information, users can make judgments that facilitate their decision-making, helping them remotely adjust settings on the receptacle 204 to improve performance and communication. For example, the RCD 244 can be configured to enable users to easily adjust callback time, which is the normal time interval for communication that is configured in the PCB 210. The RCD 244 can enable the user to alter this time setting, so that the receptacle 204 communicates at shorter or longer intervals. Once the PCB 210 initiates communication, other parameters can be reconfigured, such as awake time, which is the amount of time the receiver is in receiving mode. This enables users to make "on the fly" changes. In some cases, the PCB 210 can shut down after sending a message and listening for messages to be received. In these cases, it can be difficult to send instructions, wait for a response, send more instructions and wait for response, because the time lapse between normal communications can be a full day. However, by remotely adjusting the setting through the RCD 244, the user can make continuous adjustments while testing out the downloaded parameters in real time, and/or close to real time. This can enhance the ability of the user to remotely control the receptacle 204.

Further, the RCD 244 can alter the current of the photoeyes 222B-C, in a test to determine whether there is dirt or grime covering the lens. Here, the RCD 244 can reconfigure the normal operating current of the photoeyes 222B-C. If the lens is dirty, the signal emitter photoeye will send and the signal receiver will receive a signal on high power, but not on low power. In this way, a service call can be avoided or delayed by changing the normal operating current to the photoeyes 222B-C. This can be a useful diagnostic tool.

In some embodiments, regular maintenance intervals can be scheduled, but can also be altered via information from the RCD 244. The RCD 244 can be configured to run a cycle while testing motor current. If motor current deviates from a normal range (i.e., 2 amps or so), then a maintenance technician can be scheduled earlier than normal. The RCD 244 can send a message to the user by posting an alert on the users web page associated with the receptacle 204.

Other settings can be embodied in the receptacle 204 as well. For example, the PCB 210 can sense that the receptacle 204 is full. The RCD 244 can then configure the PCB 210 to have a web page, or another display, present a full signal. The RCD 244 can alter when the full signal should be presented to the user. For example, after accessing a database with historical collection intervals, the RCD 244 can reconfigure the PCB 210 to wait for a period of time, e.g., one hour, before displaying a full signal at the web page. This can be helpful because, in some cases, a "false positive" full signal can be signaled by the PCB 210, but this can be avoided based on historical information that indicates that a collection only a few minutes after the last collection would be highly aberrational. The RCD 244 can thus be configured to override data from the PCB 210. Instead of sending a full signal to the user, the RCD 244 reconfigures the PCB 210 to ignore the full signal temporarily, and delay the display of a full-signal on the users' web page or smart phone, in order for time to go by and additional information to be gathered about the receptacle's actual fullness status. For example, when a collection is made and ten minutes later, the fullness sensor detects the receptacle 204 is full, the fullness display message on the web page can be prevented from displaying a full status. In some cases, the bag can be full of air, causing the proximity sensor in the receptacle 204 to detect a full bin. Within a certain time period, e.g., twenty minutes in a busy location, a few hours in a less busy location, as determined based on the historical waste generation rate at the site, the bag can lose its air, and the proximity sensor can sense that the bin is less full than it was twenty minutes prior, which would not be the case if the bin was full with trash instead of air. Thus, "false positive" information can be filtered out.

Likewise, tests and checks can be performed so that false negative information is avoided as well. For example, if a bin regularly fills up daily, and there is no message that it is full after two or three days, an alert can appear on the users' web page indicating an aberration. Thresholds for normal operating parameters and adjustments to normal can be set or reset using the RCD 244, or they can be programmed to evolve through pattern recognition. Although many operating parameter adjustments can be made through the web portal, adjustments can also be made automatically. This can be controlled by a software program that aggregates data and uses patterns in an aggregate of enclosures to alter PCB 210 settings on a single enclosure. For example, if the collection data from 1,000 enclosures indicates that collection personnel collect from bins too early 50% of the time when compaction threshold setting is set to "high", compared to 10% of the time when compaction settings are set at "medium," then the RCD 244 can reprogram the compaction thresholds to the medium setting automatically, so that collection personnel can be managed better, limiting the amount of enclosures that are collected prematurely. Automatic reprogramming, governed by software programs, can be applied to other aspects, such as user response to dynamic elements of the receptacle 204, such as lighted or interactive advertising media displayed on the receptacle 204. For example, if users respond to an LCD-displayed advertisement shown on the receptacle 204 for "discounted local coffee" 80% of the time, the RCD 244 can configure all receptacles within a certain distance, from participating coffee shops, to display the message: "discounted local coffee."

In some embodiments, the RCD 244 can include a data receiving portal for the user with information displays about an aggregate of receptacles. Here, the user can access real-time and historical information of, for example, receptacles on a route, and/or receptacles in a given geography. The data can be displayed for the user on a password-protected web page associated with the aggregate of receptacles within a user group. The receptacle 204 can also display, for example, bin fullness, collections made, the time of collections, battery voltage, motor current, number and time of compaction cycles run, graphs and charts, lists and maps, etc. This data can be viewed in different segments of time and geography in order to assess receptacle and/or fleet status, usage, and/or trends. The users' web page can show, for example, a pie chart showing percentage of bins collected when their LED was blinking yellow, red and green, or a histogram showing these percentages as a function of time. These statistics can be categorized using pull down menus and single-click features. A single click map feature, for example, is where summary data for a particular receptacle is displayed after the user clicks on a dot displayed on a map which represents that receptacle. This can allow the user to easily view and interact with a visual map in an external application.

The RCD 244 can be configured to display calculated data, such as "collection efficiency," which is a comparison of collections made to collections required, as measured by the utilized capacity of the receptacle 204 divided by the total capacity of the receptacle 204 (Collection Efficiency=utilized capacity/total capacity). The user can use this information to increase or decrease collections, increase or decrease the aggregate capacity across an area, etc. Typically, the users' goal is to collect the receptacle 204 when it is full—not before or after. The user can click buttons on their web page to show historical trends, such as collection efficiency over time, vehicle costs, a comparison of vehicle usage in one time period versus vehicle usage in another time period, diversion rates, a comparison of material quantity deposited in a recycling bin versus the quantity of material deposited into a trash bin. Other statistics can be automatically generated and can include carbon dioxide emissions from trucks, which can be highly correlated to vehicle usage. Labor hours can also be highly correlated with vehicle usage, so the web page can display a labor cost statistic automatically using information generated from the vehicle usage monitor. As the user clicks on buttons or otherwise makes commands in their web portal, the RCD 244 can change the PCB's 210 operating parameters, usage of sensors, etc., and/or measurement thresholds in response. The RCD 244 can also be configured to automatically display suggested alterations to the fleet, such as suggestions to move receptacles to a new position, to increase or decrease the quantity of receptacles in a given area, to recommend a new size receptacle based on its programmed thresholds, resulting in an improvement in costs to service the fleet of receptacles.

Heat mapping can also be used to provide a graphical representation of data for a user. Heat mapping can show the user the level of capacity in each part of an area, for example a city block, or it can be used to show collection frequency in an area. In each case, the heat map can be generated by associating different colors with different values of data in a cross sectional, comparative data set, including data from a plurality of enclosures. The heat map can be a graphical representation of comparative data sets. In some embodiments, red can be associated with a high number of a given characteristic, and "cooler" colors, like orange, yellow and blue, can be used to depict areas with less of a given characteristic. For example, a heat map showing collection frequency or compaction frequency across 500 receptacles can be useful to determine areas where capacity is lacking in the aggregate of enclosures—a relative measure of capacity. In this case, the highest frequency receptacle can assigned a value of red. Each number can be assigned progressively cooler colors. In other embodiments, the red value can be associated with a deviation from the average or median, for example, a darker red for each standard deviation. The heat maps can be shown as a visual aid on the user's web page, and can color-code regions where "bottlenecks" restrict vehicle and labor efficiency. A small red region can show graphically, for example, that if the user were to replace only ten receptacles with higher-capacity compactors, the collection frequency to a larger area could be reduced, saving travel time. Heat maps can be a helpful visual tool for showing data including, but not limited to, data showing "most collections" in a given time period, "most green collections," which can visually demonstrate the number of bins collected too early (before they are actually full), "most compactions," which can show on a more granular level the usage level of the bin, "most uses," which can represent how many times the insertion door of the bin is opened or utilized, "most alerts," which can show visually the number of "door open alerts," which can show when doors were not closed properly, "voltage alerts," which can show visually which receptacles are of low power, etc. While specific measurements are described herein to demonstrate the usefulness of heat mapping, there are other sets of data that can be represented by the heat maps, which are within the scope and spirit of this invention.

The RCD 244 can also be used for dynamic vehicle routing and compaction and/or receptacle management. Because the RCD 244 can be a two-way communicator, it can both send and receive information between various receptacles and databases. This can allow the user to cross-correlate data between the fleet of receptacles and the fleet of collection vehicles. The RCD 244 can receive data from the user and/or the user's vehicle. For example, the RCD 244 can receive GPS data or availability data, and use it to change parameters on a given receptacle or aggregate of receptacles. The RCD 244 can receive this data from the users' GPS-enabled smartphone, for example. Similarly, the RCD 244 can send data to the user, a user device, a smartphone, etc., about the status of the receptacle 204. With this two-way data stream, collection optimization can be calculated in real time or close to real time. For example, a collection truck is traveling to the east side of a city and has 30 minutes of spare time. The RCD 244 can receive information about the truck's whereabouts, availability and direction, and query a database for receptacle real time and historical fullness information and determine that the truck can accommodate collections of twenty receptacle locations. The RCD 244 can then display a list of twenty receptacle locations that the truck can accommodate. The user can view a map of the twenty recommended locations, see a list of driving directions, etc. The map of driving directions can be optimized by adding other input data, such as traffic lights, traffic conditions, average speed along each route, etc. At the same time, as the truck heads to the east side of the city, the RCD 244 can reconfigure receptacles on the west side to change compaction thresholds, so that capacity is temporarily increased, freeing up additional time for the truck to spend in the east section. Alternatively, the RCD 244 can reconfigure a receptacle to temporarily display a "full" message to pedestrians, helping them find a nearby receptacle with capacity remaining. The RCD 244 can, in the case where the receptacle requires payment, increase pricing to the almost-full receptacle, reducing demand by pedestrians or other users. This same logic can be effective in situations where trucks are not used, for example, indoors at a mall or airport. The demand for waste capacity can vary, so having remote control over the receptacle 204 can allow users to change settings, parameters, and/or prices to make the collection of waste dynamic and efficient.

The location of the receptacle 204 and other receptacles can be determined via triangulation and/or GPS, for example, and placed on a map in the interactive mapping features. Moreover, the location of an indoor receptacle can be obtained from indoor WiFi hot spots, and the indoor receptacle can be placed on a map in the interactive mapping features. As a staff member accomplishes tasks (i.e., cleaning a bathroom) and moves inside a facility, the staff member's location can be tracked, and the fullness and location of nearby receptacles can be plotted on a map or given to the staff member by other means, as instructions to add a collection activity to the list of tasks. Whether by GPS, Wifi, Bluetooth, etc., triangulation between communication nodes can serve to locate a receptacle on a map, and measurements of fullness of receptacles can be used to create work instructions for staff members or truck drivers, so that efficient routes and schedules can be created to save time.

To better manage the collection process, user groups can be separated between trash and recycling personnel. In many cities, there are separate trucks used to collect separate streams of waste, such as trash and recyclables. For this reason, it can be helpful to configure the user's web page to display data based on a waste stream. The data can also be divided in this fashion and displayed differently on a smartphone, hand-held computer, and/or other user device. In addition, data can be displayed differently to different users. For example, the manager of an operation can have "administrative privileges," and thus can change the location of a particular receptacle in the system, view collection efficiency of a particular waste collector, view login history, and/or view industry or subgroup benchmarks, while a waste collector with lower privileges can only view receptacle fullness, for example. The RCD 244 or another device can also be configured to print a list of receptacles to collect next, a list of full or partially full bins, etc. For example, the remote device 252 can be configured to print a list of receptacles to collect in the remaining portion of a route.

Figure 3:
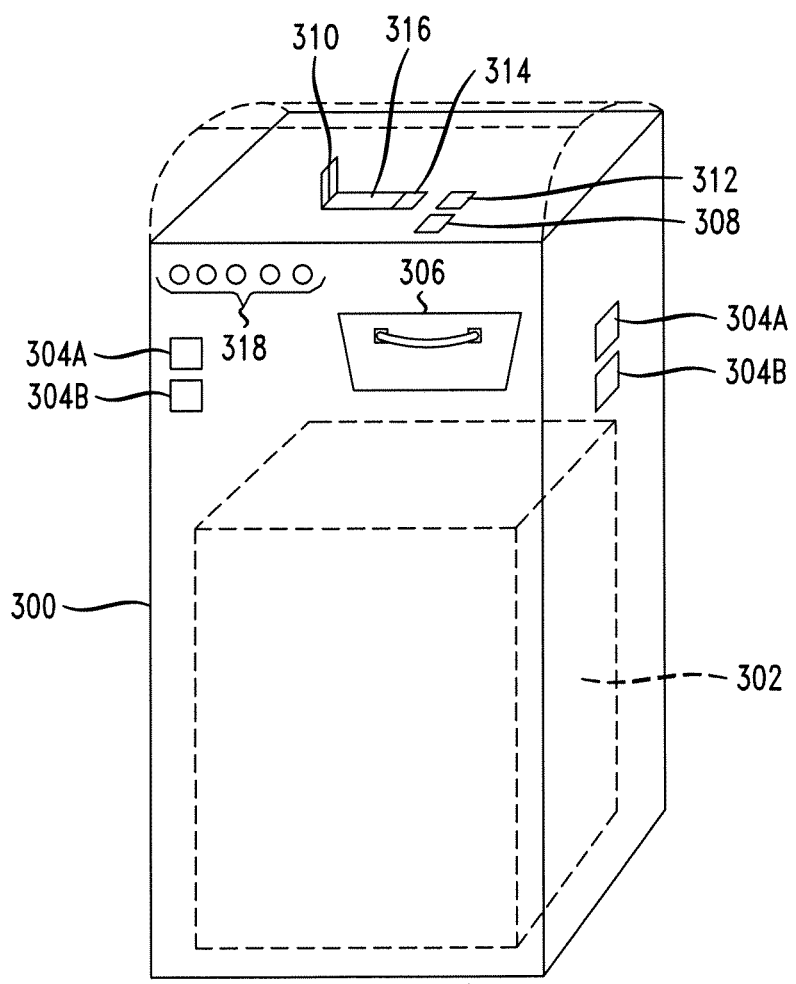
FIG. 3 illustrates an example storage receptacle.

FIG. 3 illustrates an example storage receptacle 300. The storage receptacle 300 includes a bin 302 for storing content items, and a door 306 for opening the storage receptacle 300 to throw items in the bin 302. The storage receptacle 300 can have one or more photoeye sensors 304A-B placed above the bin 302 for detecting the fullness state of the bin 302. The storage receptacle 300 can also include a sonar sensor 308 to detect objects in the receptacle 300 and calculate the fullness state of the receptacle 300. As one of ordinary skill in the art will readily recognize, the sonar sensor 308 and photoeye sensors 304A-B can also be placed in other locations based on the size and/or capacity of the receptacle 300, storage requirements, storage conditions, etc. The storage receptacle 300 can also include other types of sensors, such as an infrared sensor, a temperature sensor, a hall effect sensor, an encoder sensor, a motion sensor, a proximity sensor, etc. The sonar sensor 308 and photoeye sensors 304A-B can sense fullness at regular intervals, and/or based on manual inputs and/or a pre-programmed schedule, for example. Moreover, the sonar sensor 308 and photoeye sensors 304A-B are electrically connected to the printed circuit board (PCB) 316. Further, the sonar sensor 308 and photoeye sensors 304A-B can be actuated by the PCB 316, which can be configured to control the various operations of the storage receptacle 300.

The PCB 316 can control electrical functions performed by the storage receptacle 300. The electrical functions controlled by the PCB 316 can include, for example, running compactions by actuating a motor; sensing waste or recyclables volume inside the receptacle 300 using a sensor at regular or programmable intervals, such as photoeye sensors 304A-B; changing status lamps 318 at regular and/or programmable thresholds to/from a color indicating that the receptacle 300 is not full (e.g., green), to/from a color indicating that the receptacle 300 is almost full (e.g., yellow), to/from a color indicating that the receptacle 300 is full (e.g., red); collecting data and transmitting the data to another device; receiving data from another device; managing a power mode; measuring and managing a current; performing diagnostics tests; managing a power source; etc. The H-bridge 310 can enable voltage to be applied across a load in either direction. The PCB 316 can use the H-bridge 310 to enable a DC motor in the receptacle 300 to run forwards and backwards, to speed or slow, to "brake" the motor, etc.

The storage receptacle 300 includes a transmitter 312 and a receiver 314 for sending and receiving data to and from other devices, such as a server or a remote control device. Accordingly, the storage receptacle 300 can transmit and receive information such as instructions, commands, statistics, alerts, notifications, files, software, data, and so forth. The transmitter 312 and receiver 314 can be electrically connected to the PCB 316. This way, the transmitter 312 can transmit data from the PCB 316 to other devices, and the receiver 314 can receive data from other devices and pass the data for use by the PCB 316.

Status lamps 318 can provide an indication of the status of the storage receptacle 300. For example, the status lamps 318 can indicate the fullness state of the storage receptacle 300. To this end, the status lamps 318 can be configured to display a respective color or pattern when the storage receptacle 300 is full, almost full, not full, etc. For example, the status lamps 318 can be configured to flash red when the storage receptacle 300 is full, yellow when the storage receptacle 300 is almost full, and green when the storage receptacle 300 is not full. Moreover, the status lamps 318 can be LED lights, for example.

As one of ordinary skill in the art will readily recognize, the receptacle 300 can include other components, such as motors, sensors, batteries, solar panels, displays, relays, chargers, GPS devices, timers, fuses, resistors, remote control devices, cameras, etc. However, for the sake of clarity, the receptacle 300 is illustrated without some of these components.

Figure 4:
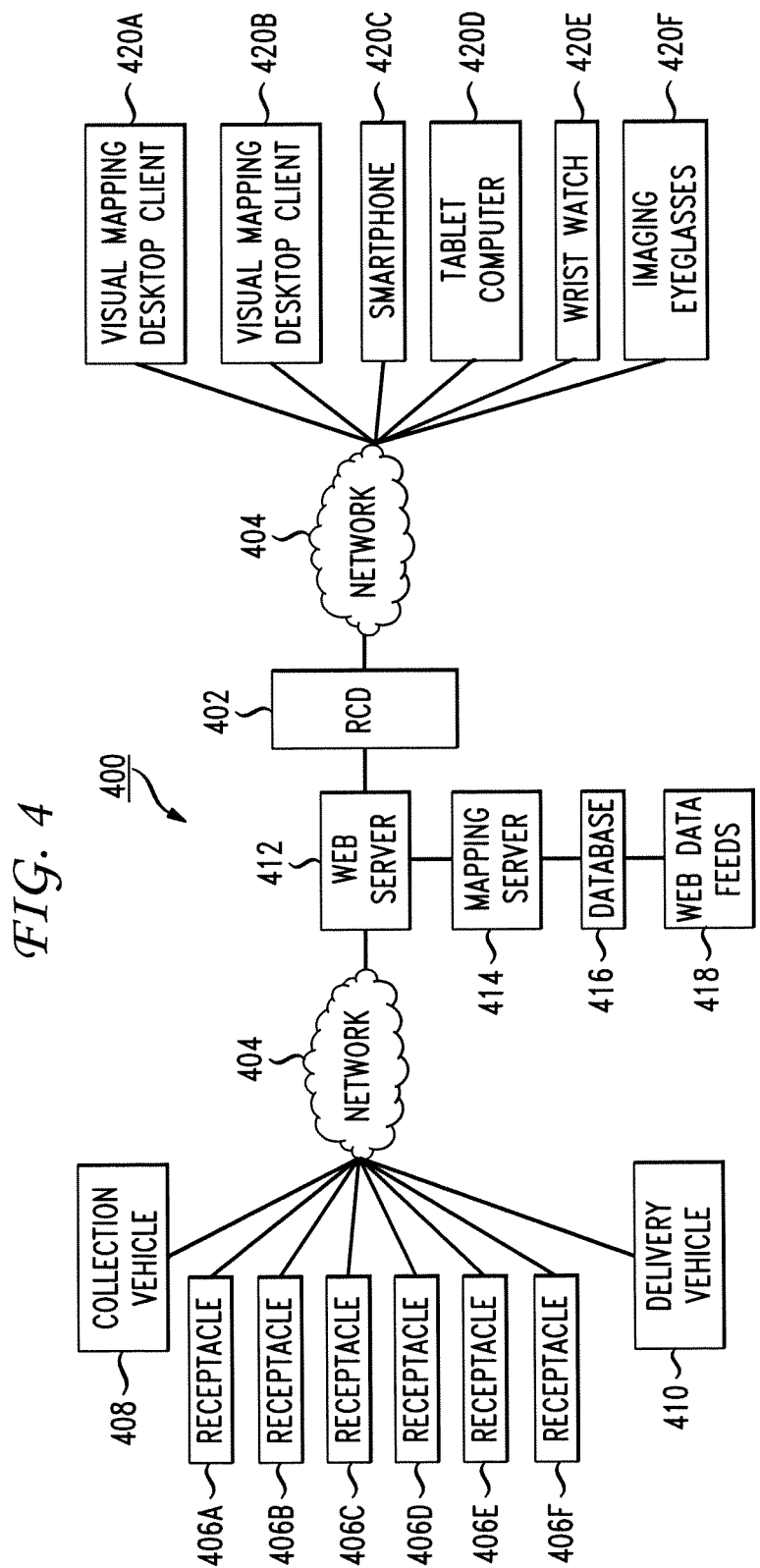
FIG. 4 illustrates an example network architecture.

FIG. 4 illustrates an example network architecture 400. The network architecture 400 can be used to control receptacles over a network. In particular, the remote control device 402 can control the receptacles 406A-F over the network 404. The network 404 can include a public network, such as the Internet, but can also include a private or quasi-private network, such as an intranet, a home network, a virtual private network (VPN), a shared collaboration network between separate entities, etc. Indeed, the network 404 can include many types of networks, such as local area networks (LANs), virtual LANs (VLANs), corporate networks, wide area networks, a cell phone transmitter and receiver, a WiFi network, a Bluetooth network, and virtually any other form of network.

The remote control device 402 can transmit data to the receptacles 406A-F and/or vehicles 408, 410 over the network 404. For example, the remote control device 402 can transmit data to the receptacles 406A-F to change parameters, configurations, settings, and/or operations at the receptacles 406A-F. The remote control device 402 can also transmit other information to the receptacles 406A-F, such as statistics, software, updates, commands, instructions, inputs, requests, etc. Moreover, the remote control device 402 can transmit information, such as updates, statistics, and instructions, to the vehicles 408 and 410. For example, the remote control device 402 can transmit data to the collection vehicle 408 indicating that the receptacle 406A is full and needs to be collected.

Similarly, the receptacles 406A-F can transmit information to the remote control device 402 over the network 404. For example, the receptacles 406A-F can transmit a notification of a condition at the receptacles 406A-F to the remote control device 402. As another example, the receptacles 406A-F can transmit an acknowledgment to the remote control device 404 after receiving data from the remote control device 402. The receptacles 406A-F can also transmit data to the web server 412, mapping server 414, databases 416, and/or web data feeds 418. For example, the receptacles 406A-F can measure their fullness states and transmit the measured data to the databases 416. The receptacles 406A-F can also transmit their location, fullness states, capacity, collection history, collection schedules, etc., to the mapping server 414, which can map the receptacles 406A-F to generate a map and/or a list of the receptacles 406A-F based on the data from the receptacles 406A-F. The user can access the data from the mapping server 414 to view the location and/or status of the receptacles 406A-F, for example, a change the receptacles settings, parameters, operations, schedules, routes, collection procedures, energy consumption, etc.

The remote control device 402 can also access the data from the web server 412, mapping server 414, databases 416, and/or web data feeds 418, and transmit the data to the devices 420A-F over the network 404. Users can then access the data transmitted by the remote control device 402 at the devices 420A-F. Users can also transmit data from the devices 420A-F to the remote control device 402, to be transmitted to the receptacles 406A-F. For example, a user can transmit a request to change a parameter on the receptacles 406A-F from the smartphone 420C to the remote control device 402. Users can also communicate with the remote control device 402 via any other networked device, such as a laptop, a desktop, a portable player, etc.

Figure 5:
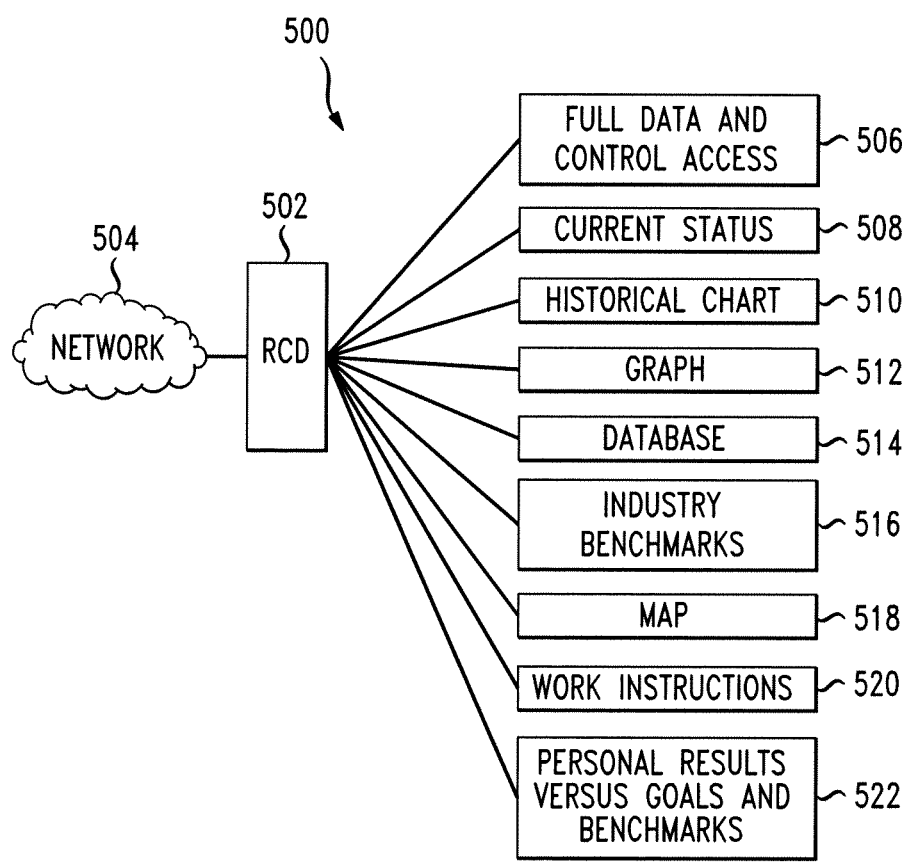
FIG. 5 illustrates an example schematic diagram 500 of elements for controlling receptacles via a remote control device.

FIG. 5 illustrates an example schematic diagram 500 of elements for controlling receptacles via a remote control device. The remote control device 502 can use the elements 506-522 to change thresholds, parameters, configurations, settings, operations, etc., at a remote receptacle. For example, the remote control device 502 can analyze full data and control access information 506, current status information, historical chart information 510, graph information 512, data from databases 514, industry benchmarks 516, map information 518, work instructions, and/or information regarding personal results versus goals and benchmarks 522. As one of ordinary skill in the art will readily recognize, the remote control device 502 can also analyze other type of information, such as user inputs, information from the Internet, information from a search engine, web data feeds, profile information, weather information, regulations, etc.

The remote control device 502 can use the data from the elements 506-522 to generate new elements and/or update current elements. For example, the remote control device 502 can use the current status information 508 to update a map 518 representing one or more receptacles in an area. The remote control device 502 can also use the data from the elements 506-522 to make calculations and/or decisions. For example, the remote control device 502 can use information from the historical chart 510 to determine whether a compaction should be run at a particular receptacle. Here, the remote control device 502 can analyze fullness data and capacity data from the receptacle and supplement that information with historical information and/or trends from the historical chart 510 to obtain a more accurate and/or refined decision, for example.

The remote control device 502 can transmit data generated from the elements 506-522 to a remote receptacle, a remote device, a vehicle, a mobile device, a server, etc. The remote control device 502 can transmit the data over the network 504. The network 504 can include a public network, such as the Internet, but can also include a private or quasi-private network, such as an intranet, a home network, a virtual private network (VPN), a shared collaboration network between separate entities, etc. Indeed, the network 504 can include many types of networks, such as local area networks (LANs), virtual LANs (VLANs), corporate networks, wide area networks, a cell phone transmitter and receiver, a WiFi network, a Bluetooth network, and virtually any other form of network.

Figure 6:
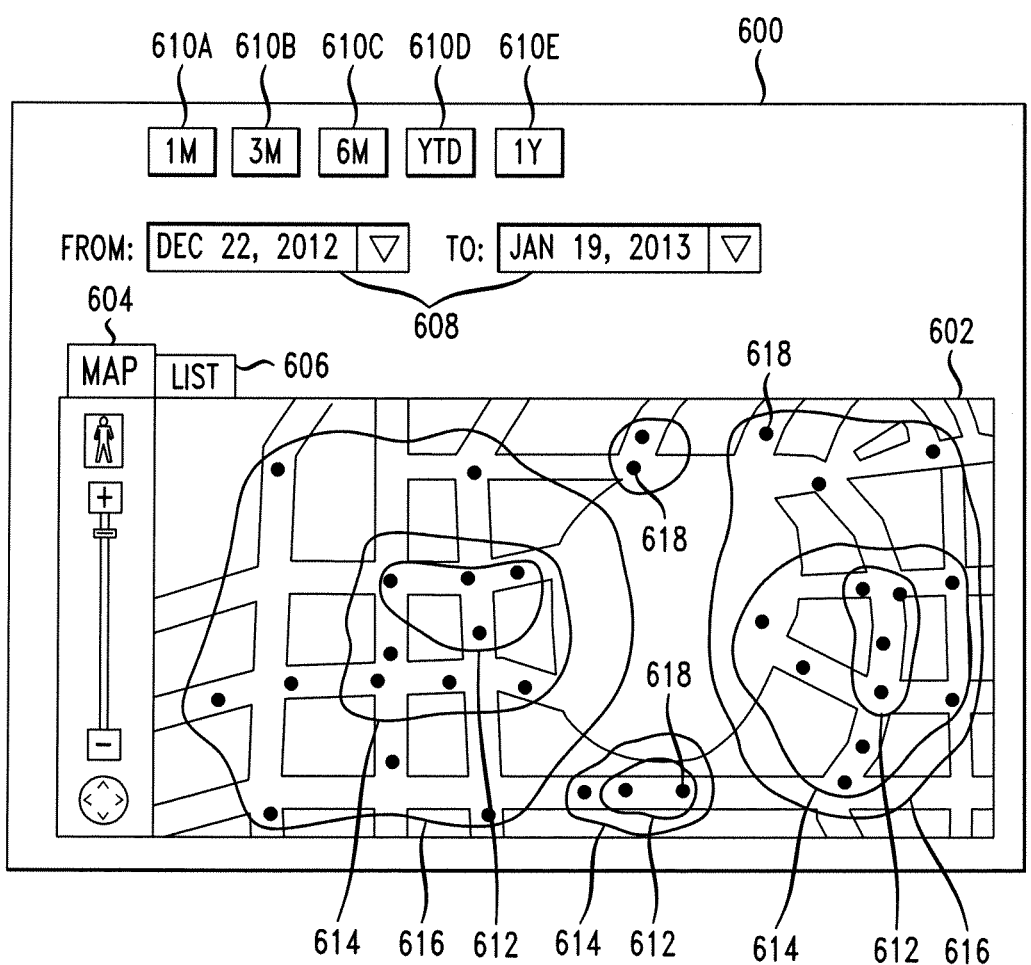
FIG. 6 illustrates an example of a collection map for an area.

FIG. 6 illustrates an example of a display 600 of a collection map 602 for an area. The display 600 can include a map option 604 and/or a list option 606 for displaying receptacle and/or vehicle information. The map 602 can display information relating to receptacles and/or vehicles in a particular area. The area depicted by the map 602 can be zoomed in and zoomed out to change the size of the area depicted by the map 602. Moreover, the map 602 can depict the receptacles 618 in an area, which can allow the user to identify the location of receptacles in the area and/or the quantity/volume of receptacles in the area. The user can select a receptacle in the map to view additional information about the receptacle, such as fullness capacity, fullness state, power mode, energy consumption, collection frequency, compaction history, battery status, maintenance information, receptacle status, receptacle thresholds, receptacle settings, receptacle route, receptacle collection schedule, etc. The map 602 can also depict vehicles in the area and any information about the vehicles, to allow a user check the status of a vehicle and/or a route, and make any re-routing decisions based on the vehicle information.

Furthermore, the map 602 can identify collection areas 612-616 having a similar characteristic, such as a same collection route, a similar collection frequency, a similar level of activity, a similar concentration of receptacles, etc. For example, the map 602 can identify collection areas 612 having a high concentration of receptacles, collection areas 614 having a medium concentration of receptacles, and collection areas 616 having a low concentration of receptacles.

The map 602 can display current status information and/or information from a range of dates. For example, the map 602 can have an area for a date input 608 to allow a user to select a range of dates for displaying information. The map 602 can also have date filters 610A-E for quickly narrowing the age of information depicted by the map 602. For example, the map 602 can include a date filter 610A for generating a map based on information dating back one year from the current date. This way, the user can quickly select the age of information depicted by the map 602.

The map 602 can display information about an aggregate of receptacles. Here, the user can access real-time and historical information of, for example, receptacles on a route, and/or receptacles in a given geography. The map 602 can also display, for example, bin fullness, collections made, the time of collections, battery voltage, motor current, number and time of compaction cycles run, graphs and charts, etc. This data can be viewed in different segments of time and geography in order to assess receptacle and/or fleet status, usage, and/or trends. The map 602 can show, for example, a pie chart showing percentage of bins collected when their LED was blinking yellow, red and green, or a histogram showing these percentages as a function of time. These statistics can be categorized using pull down menus and single-click features. A single click map feature, for example, is where summary data for a particular receptacle is displayed after the user clicks on a dot 618 displayed on a map which represents that receptacle. This can allow the user to easily view and interact with the map 602 from the display 600.

The map 602 can be configured to display calculated data, such as "collection efficiency," which is a comparison of collections made to collections required, as measured by the utilized capacity of a receptacle divided by the total capacity of the receptacle (Collection Efficiency=utilized capacity/ total capacity). The user can use this information to increase or decrease collections, increase or decrease the aggregate capacity across an area, etc. The user can click buttons on the map 602 to show historical trends, such as collection efficiency over time, vehicle costs, a comparison of vehicle usage in one time period versus vehicle usage in another time period, diversion rates, a comparison of material quantity deposited in a recycling bin versus the quantity of material deposited into a trash bin. Other statistics can be automatically generated and can include carbon dioxide emissions from trucks, which can be highly correlated to vehicle usage. Labor hours can also be highly correlated with vehicle usage, so the map 602 can display a labor cost statistic automatically using information generated from the vehicle usage monitor. The map 602 can also be configured to display suggested alterations to the fleet, such as suggestions to move receptacles to a new position, to increase or decrease the quantity of receptacles in a given area, to recommend a new size receptacle based on its programmed thresholds, resulting in an improvement in costs to service the fleet of receptacles.

The map 602 can also be used for dynamic vehicle routing and compaction and/or receptacle management. The map 602 can allow the user to cross-correlate data between the fleet of receptacles and the fleet of collection vehicles. The map 602 can depict information based on data from a server, one or more receptacles, the user, the user's vehicle, external websites, external databases, etc. For example, the map 602 can receive GPS data or availability data, and use it to update the map 602. The map 602 can receive information about a truck's whereabouts, availability and direction, and query a database for receptacle real time and historical fullness information and determine that the truck can accommodate collections of more or less locations in the area. The map 602 can then display the receptacle locations that the truck can accommodate. The user can view the map 602 of recommended locations, see a list of driving directions, etc. The map of driving directions can be optimized by adding other input data, such as traffic lights, traffic conditions, average speed along each route, etc.

The location of receptacles can be determined via triangulation and/or GPS, for example, and placed on the map 602, with interactive mapping features. Moreover, the location of an indoor receptacle can be obtained from indoor WiFi hot spots, and the indoor receptacle can be placed on map 602. As a staff member accomplishes tasks (i.e., cleaning a bathroom) and moves inside a facility, the staff member's location can be tracked, and the fullness and location of nearby receptacles can be plotted on the map 602. Whether by GPS, Wifi, Bluetooth, etc., triangulation between communication nodes can serve to locate a receptacle on the map 602, and measurements of fullness of receptacles can be used to create work instructions for staff members or truck drivers, so that efficient routes and schedules can be created to save time.

Figure 7:
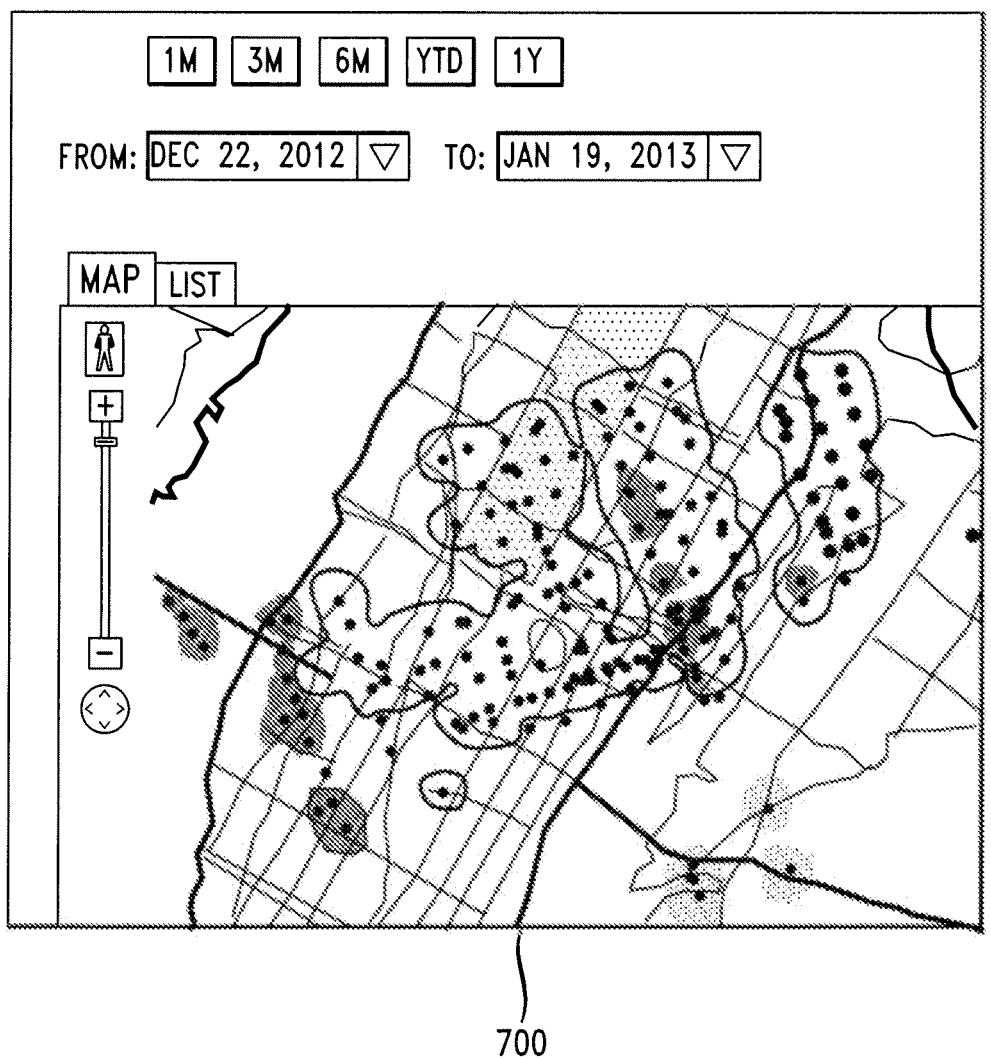
FIG. 7 illustrates an example of a collection map for an area with heat mapping.

FIG. 7 illustrates an example of a collection map 700 for an area with heat mapping. Heat mapping can be used to provide a graphical representation of data for a user. Heat mapping can show the user the level of capacity in each part of an area, for example a city block, or it can be used to show collection frequency in an area. In each case, the heat map 700 can be generated by associating different colors with different values of data in a cross sectional, comparative data set, including data from a plurality of enclosures. The heat map can be a graphical representation of comparative data sets. In some embodiments, red can be associated with a high number of a given characteristic, and "cooler" colors, like orange, yellow and blue, can be used to depict areas with less of a given characteristic. For example, a heat map showing collection frequency or compaction frequency across 500 receptors can be useful to determine areas where capacity is lacking in the aggregate of enclosures—a relative measure of capacity. In this case, the highest frequency receptacle can assigned a value of red. Each number can be assigned progressively cooler colors. In other embodiments, the red value can be associated with a deviation from the average or median, for example, a darker red for each standard deviation. The heat map 700 can be shown as a visual aid on the user's web page, and can color-code regions where "bottlenecks" restrict vehicle and labor efficiency. A small red region can show graphically, for example, that if the user were to replace only ten receptacles with higher-capacity compactors, the collection frequency to a larger area could be reduced, saving travel time.

Heat maps can be a helpful visual tool for showing data including, but not limited to, data showing "most collections" in a given time period, "most green collections," which can visually demonstrate the number of bins collected too early (before they are actually full), "most compactions," which can show on a more granular level the usage level of the bin, "most uses," which can represent how many times the insertion door of the bin is opened or utilized, "most alerts," which can show visually the number of "door open alerts," which can show when doors were not closed properly, "voltage alerts," which can show visually which receptacles are of low power, etc. While specific measurements are described herein to demonstrate the usefulness of heat mapping, there are other sets of data that can be represented by the heat map 700, which are within the scope and spirit of this invention.

Figure 8:
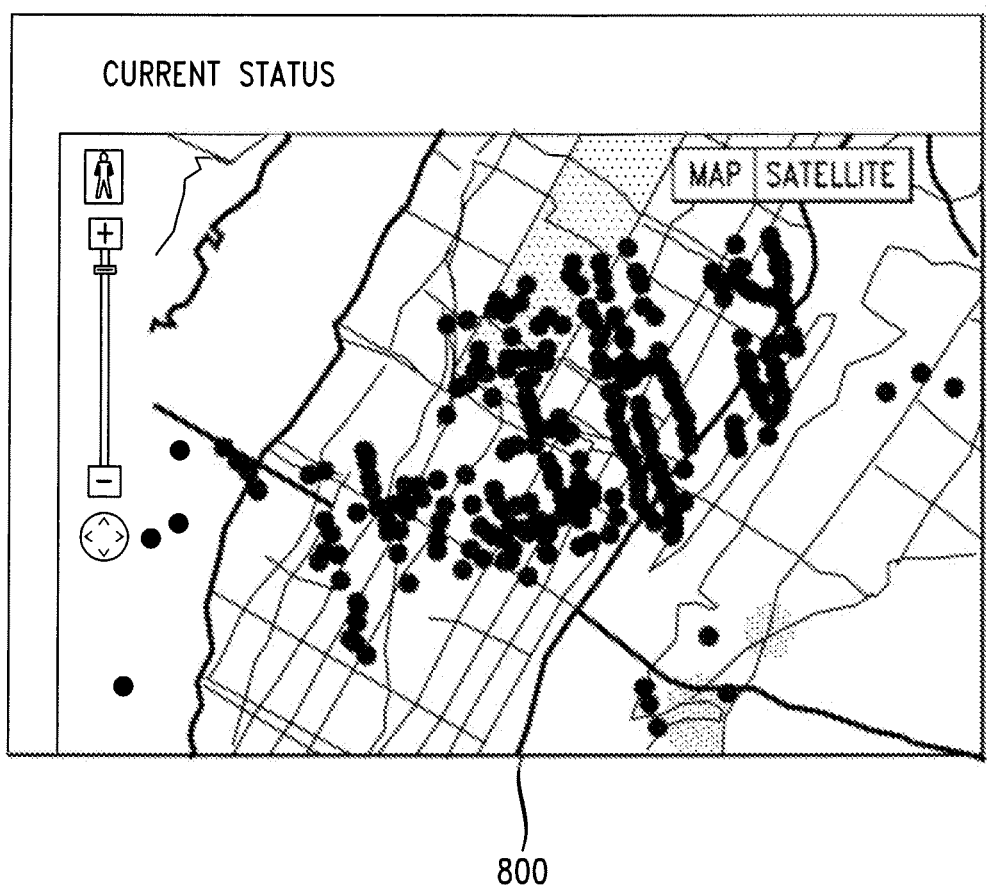
FIG. 8 illustrates an example of a collection map for an area based on current conditions.

FIG. 8 illustrates an example of a collection map 800 for an area based on current conditions. The collection map 800 illustrates a non-limiting example of a collection map as described in FIG. 6, depicting current status information.

FIG. 9 illustrates an example of a presentation 900 of collection statistics. The presentation 900 can include buttons for displaying an overview presentation 902A, a status presentation 902B, reports 902C, alerts 902D, an inventory presentation 902E, and an administration presentation 902F. The presentation 900 can display a fullness summary for a group of receptacles 906, and can present a fullness level 908 and a total volume 910 for each of the groups of receptacles 906. The fullness level 908 can be presented based on a number of receptacles in the group having a specific fullness value, fullness color representing a fullness state, fullness percentage, etc. In FIG. 9, the fullness level 908 illustrates the number of receptacles in each of the groups 906 showing a specific fullness color. Here, green can represent receptacles that are not full, yellow can represent receptacles that are almost full, and red can represent receptacles that are full, for example. The fullness volume 910 can be represented by gallons, percentage, etc.

The groups 906 can be separated by quantity, stream, location, size, trash receptacles, recycling receptacles, etc. In many cities, there are separate trucks used to collect separate streams of waste, such as trash and recyclables. For this reason, it can be helpful to configure the presentation 900 to display data based on a waste stream. The data can also be divided in this fashion and displayed differently on a smartphone, hand-held computer, and/or other user device. In addition, data can be displayed differently to different users. For example, the manager of an operation can have "administrative privileges," and thus can change the location of a particular receptacle in the system, view collection efficiency of a particular waste collector, view login history, and/or view industry or subgroup benchmarks, while a waste collector with lower privileges can only view receptacle fullness, for example.

Having disclosed some basic system components and concepts, the disclosure now turns to the example method embodiments shown in FIGS. 10 and 11. For the sake of clarity, the methods are described in terms of example system 100, as shown in FIG. 1, configured to practice the methods. The steps outlined herein are illustrative and can be implemented in any combination thereof, including combinations that exclude, add, or modify certain steps.

The system 100 receives data associated with a storage receptacle configured to communicate with the system 100 via a network, wherein the data is received from a server storing information transmitted by the storage receptacle, the storage receptacle having an energy storage for powering operational functions performed by the storage receptacle (1000). The storage receptacle can be a solar and/or battery powered compactor, for example. The system 100 then identifies a parameter of the storage receptacle associated with an operational function of the storage receptacle (1002), and transmits a signal to the storage receptacle for modifying the parameter based on the data associated with the storage receptacle to yield a modified operation of the storage receptacle (1004). In some embodiments, the system 100 can also transmit the data to a device associated with a user for presentation to the user. The system 100 can then receive an instruction from the device associated with the user to modify the parameter of the storage receptacle. The system 100 can also receive additional data from the device, a request from the user, an input from the user, a command from the device, a notification from the device, a parameter, an update, a configuration setting, a file, etc.

The operational function can include, for example, compacting contents, sensing contents volume inside the storage receptacle, powering a status lamp, communicating with the remote control device, communicating with the server, powering the storage receptacle, gathering weather data, gathering temperature information, running a sensor, measuring a current, detecting a movement of an item in the storage receptacle, testing a battery, powering an advertisement display, etc. Moreover, the parameter can include a compaction timing, an energy usage, a timing of a sensor actuation, a desired capacity, a fullness threshold, a power mode, a fullness state, a command, a status update, an energy setting, an operating setting, a collection timing, a communication interval, a test setting, an operating current, a compaction trigger, etc. Further, the modified operation can include a modified compaction schedule, a modified compaction threshold, a modified power mode, a modified capacity, a modified sensing timing, a modified communication schedule, a modified operation of the motor, an actuation of an operation, a termination of an operation, etc.

The parameter can be modified based on the data, a user input, weather conditions, a collection schedule, data about a collection route, traffic conditions, a proximity of a collection vehicle, a time, a date, a location, a capacity, a fullness state, lapsed time between collections, lapsed time between compactions, usage conditions, energy usage, battery conditions, statistics, a detected movement of an object, industry benchmarks, historical data, forecasted data, collection trends, industry standards, real-time information, user preferences, etc. The data can include sensed data, statistics, operating conditions, device characteristics, fullness state, a device status, data about an event, a measurement, data about an operation, a log, an alert, a value, real-time information, a diagnosis, a user input, etc.

FIG. 11 illustrates a second method embodiment. The system 100 transmits data associated with the system 100 to a server, the system 100 having an energy storage for powering operational functions performed by the system 100 (1100). The system 100 can be, for example, a battery, solar, and/or AC powered compactor and/or receptacle. For example, the system 100 can be a storage receptacle as described above with reference to FIG. 2. The system 100 the receives a signal for modifying a parameter of the system 100 based on the data associated with the system 100, wherein the parameter is associated with an operational function of the system 100, and wherein the signal is received from a remote control device via a network (1102). The system 100 then modifies the parameter of the system 100 according to the signal to yield a modified operation of the system 100 (1104).

The operational function can include, for example, compacting contents, sensing contents volume inside the storage receptacle, powering a status lamp, communicating with the remote control device, communicating with the server, powering the storage receptacle, gathering weather data, gathering temperature information, running a sensor, measuring a current, detecting a movement of an item in the storage receptacle, testing a battery, powering an advertisement display, etc. Moreover, the parameter can include a compaction timing, an energy usage, a timing of a sensor actuation, a desired capacity, a fullness threshold, a power mode, a fullness state, a command, a status update, an energy setting, an operating setting, a collection timing, a communication interval, a test setting, an operating current, a compaction trigger, etc. Further, the modified operation can include a modified compaction schedule, a modified compaction threshold, a modified power mode, a modified capacity, a modified sensing timing, a modified communication schedule, a modified operation of the motor, an actuation of an operation, a termination of an operation, etc.

The parameter can be modified based on the data, a user input, weather conditions, a collection schedule, data about a collection route, traffic conditions, a proximity of a collection vehicle, a time, a date, a location, a capacity, a fullness state, lapsed time between collections, lapsed time between compactions, usage conditions, energy usage, battery conditions, statistics, a detected movement of an object, industry benchmarks, historical data, forecasted data, collection trends, industry standards, real-time information, user preferences, etc. The data can include sensed data, statistics, operating conditions, device characteristics, fullness state, a device status, data about an event, a measurement, data about an operation, a log, an alert, a value, real-time information, a diagnosis, a user input, etc.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
receiving, via a remote control device, data collected over a first time interval by one or more sensors associated with a storage receptacle, the data corresponding to the performance of an operational function by the storage receptacle over the first time interval, the storage receptacle configured to communicate with the remote control device via a network, wherein the performance of the operational function is related to at least one of: compacting contents, sensing contents volume inside the storage receptacle, powering a status lamp, communicating with the remote control device, powering the storage receptacle, gathering weather data, gathering temperature information, running a sensor, measuring a current, detecting a movement of an item in the storage receptacle, testing a battery, and powering an advertisement display;
identifying, within the received data, a parameter associated with the performance of the operational function over the first time interval, wherein the parameter is related to at least one of a compaction timing, an energy usage, a timing of a sensor actuation, a desired capacity, a fullness threshold, a power mode, a fullness state, a command, a status update, an energy setting, an operating setting, a collection timing, a communication interval, a test setting, an operating current, and a compaction trigger;
modifying a value of the parameter identified within the received data to yield a modified parameter;
transmitting, from the remote control device, the modified parameter to cause a change, without user intervention at the storage receptacle, in a future performance of the operational function by the storage receptacle; and
displaying, via the remote control device, a location of the storage receptacle in a particular area on at least one of a map or a list.

2. The method of claim 1, wherein the storage receptacle comprises a solar-powered compactor, and wherein the operational function further comprises compacting contents.

3. The method of claim 1, wherein the operational function that was changed comprises at least one from among a modified compaction schedule, a modified compaction threshold, a modified power mode, a modified capacity, and a modified sensing timing.

4. The method of claim 1, wherein the parameter is modified based on at least one from among the data, a user input, weather conditions, a collection schedule, an associated collection route, traffic conditions, a proximity of a collection vehicle, a time, a date, a location, a capacity, a fullness state, lapsed time between collections, lapsed time between compactions, usage conditions, energy usage, battery conditions, statistics, a detected movement of an object, industry benchmarks, historical data, forecasted data, collection trends, industry standards, real-time information, and user preferences.

5. The method of claim 1, wherein the data comprises at least one from among sensed data, statistics, operating conditions, device characteristics, fullness state, a device status, data about an event, a measurement, data about an operation, a log, an alert, a value, real-time information, and a diagnosis.

6. The method of claim 1, further comprising:
transmitting the data to a device associated with a user for presentation to the user; and
receiving an instruction from the device associated with the user to modify the parameter of the storage receptacle.

7. A method comprising:
transmitting, via a storage receptacle, data collected over a first time interval by one or more sensors associated with the storage receptacle to a remote control device, the data corresponding to the performance of an operational function by the storage receptacle over the first time interval;
receiving, at the storage receptacle and from the remote control device via a network, a modification of a value of a parameter identified within the received data, the parameter associated with the performance of the operational function over the first time interval;
modifying, without manual user intervention at the storage receptacle, a future performance of the operational function by the storage receptacle according to the modification of the value of the identified parameter; and
transmitting, by the storage receptacle, information associated with a location of the storage receptacle to the remote control device for being displayed, via the remote control device, in a particular area on at least one of a map or a list.

8. The method of claim 7, wherein the data comprises at least one from among sensed data, statistics, operating conditions, device characteristics, fullness state, a device status, data about an event, a measurement, data about an operation, a log, an alert, a value, real-time information, and a diagnosis.

9. The method of claim 7, wherein the storage receptacle comprises a solar-powered compactor, and wherein the operational function further comprises compacting contents.

10. The method of claim 7, wherein the operational function further comprises at least one from among compacting contents, sensing contents volume inside the storage receptacle, powering a status lamp, communicating with the remote control device, powering the storage receptacle, gathering weather data, gathering temperature information, running a sensor, measuring a current, detecting a movement of an item in the storage receptacle, testing a battery, and powering an advertisement display.

11. The method of claim 7, wherein the parameter comprises at least one from among a compaction timing, an energy usage, a timing of a sensor actuation, a desired capacity, a fullness threshold, a power mode, a fullness state, a command, a status update, an energy setting, an operating setting, a collection timing, a communication interval, a test setting, an operating current, and a compaction trigger.

12. The method of claim 7, wherein the operational function that was modified comprises at least one from among a modified compaction schedule, a modified compaction threshold, a modified power mode, a modified capacity, and a modified sensing timing.

13. A receptacle comprising:
a processor;
a transmitter for transmitting information to another device via a network;
a receiver for receiving information transmitted to the receptacle via the network;
a storage receptacle for storing content items; and
a computer-readable storage medium having stored therein instructions which, when executed by the processor, cause the processor to perform operations comprising:
transmitting information associated with the storage receptacle to a remote control device, the information collected over a first time interval by one or more sensors, the information corresponding to the performance of an operational function by the storage receptacle over the first time interval;
receiving a modification of a value of a parameter identified within the information, the parameter associated with the performance of the operational function over the first time interval, and wherein the modification of the value of the parameter is received from the remote control device on the network;
modifying, without manual user intervention at the storage receptacle, a future performance of the operational function by the storage receptacle according to the modification of the value of the identified parameter; and
transmitting information associated with a location of the receptacle to the remote control device for being displayed, via the remote control device, in a particular area on at least one of a map or a list.

14. The receptacle of claim 13, further comprising a motor and at least one from among a proximity sensor, a sonar-based sensor, a photoeye sensor, an encoder sensor, a door sensor, a hall effect sensor, a camera, an infrared sensor, a display, a light-emitting diode, a battery, a printed circuit board, and an antenna, wherein the receptacle comprises a solar-powered compactor, and wherein the operational function further comprises compacting contents.

15. The receptacle of claim 13, wherein the operational function further comprises at least one from among compacting contents, sensing contents volume inside the storage receptacle, powering a status lamp, communicating with the remote control device, powering the storage receptacle, gathering weather data, gathering temperature information, running a sensor, measuring a current, detecting a movement of an item in the storage receptacle, testing a battery, and powering an advertisement display, and wherein the parameter further comprises at least one from among an energy usage, a timing of a sensor actuation, a desired capacity, a fullness threshold, a power mode, a fullness state, a command, a status update, an energy setting, an operating setting, a collection timing, a communication interval, a test setting, an operating current, and a compaction trigger.

16. A remote control device comprising:
a processor;
a transmitter for transmitting information to another device via a network;
a receiver for receiving information transmitted to the remote control device via the network; and
a computer-readable storage medium having stored therein instructions which, when executed by the processor, cause the processor to perform operations comprising:
- receiving data collected over a first time interval by one or more sensors associated with a storage receptacle, the data corresponding to the performance of an operational function by the storage receptacle over the first time interval, the storage receptacle configured to communicate with the remote control device via the network;
- identifying, within the received data, a parameter of the storage receptacle associated with the performance of the operational function over the first time interval;
- receiving a modification of a value of the parameter identified within the received data;
- transmitting the modification of the value of the parameter to the storage receptacle to cause a change, without user intervention at the storage receptacle, in a future performance of the operational function by the storage receptacle; and
- displaying a location of the storage receptacle in a particular area on at least one of a map or a list.

17. The remote control device of claim 16, wherein the operational function further comprises at least one from among compacting contents, sensing contents volume inside the storage receptacle, powering a status lamp, communicating with the remote control device powering the storage receptacle, gathering weather data, gathering temperature information, running a sensor, measuring a current, detecting a movement of an item in the storage receptacle, testing a battery, and powering an advertisement display, and wherein the parameter comprises at least one from among a compaction timing, an energy usage, a timing of a sensor actuation, a desired capacity, a fullness threshold, a power mode, a fullness state, a command, a status update, an energy setting, an operating setting, a collection timing, a communication interval, a test setting, an operating current, and a compaction trigger.

18. The remote control device of claim 16, wherein the computer-readable storage medium stores additional instructions which result in the operations further comprising:
- receiving information from a first device associated with a collection vehicle, the information comprising at least one from among a location of the collection vehicle, an identification of the collection vehicle, a status of the collection vehicle, a proximity of the collection vehicle to the storage receptacle, a schedule of the collection vehicle, statistics associated with the collection vehicle, a route associated with the collection vehicle, a condition of the collection vehicle, traffic information, and a capacity of the collection vehicle;
- transmitting the information and the data associated with the storage receptacle to a second device associated with a user for presentation to the user; and
- receiving an instruction from the second device to modify the parameter of the storage receptacle.

19. The method of claim 1, further comprising upon receiving user input for selecting a representation of the storage receptacle, displaying, via the remote control device, displaying additional information about the storage receptacle.

20. The remote control device of claim 16, wherein the computer-readable storage medium stores additional instructions which result in the operations further comprising:
- upon receiving user input for selecting a representation of the storage receptacle, displaying, via the remote control device, displaying additional information about the storage receptacle.

* * * * *